(12) United States Patent
Wang et al.

(10) Patent No.: US 10,534,472 B2
(45) Date of Patent: Jan. 14, 2020

(54) COMMON ELECTRODE DRIVING AND COMPENSATION FOR PIXELATED SELF-CAPACITANCE TOUCH SCREEN

(71) Applicant: Apple Inc., Cupertino, CA (US)

(72) Inventors: Chaohao Wang, Sunnyvale, CA (US); Wonjae Choi, Cupertino, CA (US); Paolo Sacchetto, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 210 days.

(21) Appl. No.: 15/687,354

(22) Filed: Aug. 25, 2017

(65) Prior Publication Data

US 2017/0351378 A1 Dec. 7, 2017

Related U.S. Application Data

(63) Continuation of application No. 15/524,611, filed as application No. PCT/US2014/064120 on Nov. 5, 2014, now abandoned.

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01); *G06F 3/0412* (2013.01); *G06F 2203/04101* (2013.01)

(58) Field of Classification Search
CPC ...... G06F 3/0416; G06F 3/0412; G06F 3/044; G06F 2203/04101
See application file for complete search history.

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

CN 1202254 A 12/1998
CN 2012-18943 Y 4/2009
(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Ibrahim A Khan
(74) *Attorney, Agent, or Firm* — Kubota & Basol LLP

(57) ABSTRACT

A touch screen is disclosed. A plurality of common electrodes can be configured to operate as display circuitry during a display phase, and to operate as touch sensing circuitry during a touch sensing phase. The plurality of common electrodes can include a first common electrode associated with a first display pixel, and a second common electrode associated with a second display pixel. Circuitry can be configured to update the first display pixel at a first time while driving the first common electrode but not the second common electrode, and update the second display pixel at a second time, after the first time, while driving the second common electrode but not the first common electrode. In some examples, the circuitry can be configured to leave the second common electrode floating while driving the first common electrode, and leave the first common electrode floating while driving the second common electrode.

24 Claims, 9 Drawing Sheets

(56) References Cited

U.S. PATENT DOCUMENTS

| | | | |
|---|---|---|---|
| 5,650,597 A | 7/1997 | Redmayne | |
| 5,825,352 A | 10/1998 | Bisset et al. | |
| 5,835,079 A | 11/1998 | Shieh | |
| 5,847,690 A | 12/1998 | Boie et al. | |
| 5,880,411 A | 3/1999 | Gillespie et al. | |
| 5,889,236 A | 3/1999 | Gillespie et al. | |
| 5,914,465 A | 6/1999 | Allen et al. | |
| 6,188,391 B1 | 2/2001 | Seely et al. | |
| 6,204,897 B1 | 3/2001 | Colgan et al. | |
| 6,310,610 B1 | 10/2001 | Beaton et al. | |
| 6,323,846 B1 | 11/2001 | Westerman et al. | |
| 6,587,358 B1 | 7/2003 | Yasumura | |
| 6,690,387 B2 | 2/2004 | Zimmerman et al. | |
| 6,847,354 B2 | 1/2005 | Vranish | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 7,898,122 B2 | 3/2011 | Andrieux et al. | |
| 8,355,887 B1 | 1/2013 | Harding et al. | |
| 8,479,122 B2 | 7/2013 | Hotelling et al. | |
| 8,665,237 B2 | 3/2014 | Koshiyama et al. | |
| 8,766,950 B1 | 7/2014 | Morein et al. | |
| 8,773,351 B2 | 7/2014 | Rekimoto | |
| 8,917,256 B2 | 12/2014 | Roziere | |
| 9,000,782 B2 | 4/2015 | Roziere | |
| 9,151,791 B2 | 10/2015 | Roziere | |
| 9,250,757 B2 | 2/2016 | Roziere | |
| 9,442,330 B2 | 9/2016 | Huo | |
| 9,535,547 B2 | 1/2017 | Roziere | |
| 9,640,991 B2 | 5/2017 | Blondin et al. | |
| 9,857,925 B2 * | 1/2018 | Morein | G06F 3/044 |
| 10,007,388 B2 | 6/2018 | Roziere | |
| 10,146,359 B2 | 12/2018 | Tang | |
| 2002/0015024 A1 | 2/2002 | Westerman et al. | |
| 2003/0075427 A1 | 4/2003 | Caldwell | |
| 2004/0243747 A1 | 12/2004 | Rekimoto | |
| 2005/0219228 A1 | 10/2005 | Alameh et al. | |
| 2006/0161871 A1 | 7/2006 | Hotelling et al. | |
| 2006/0197753 A1 | 9/2006 | Hotelling | |
| 2008/0012835 A1 | 1/2008 | Rimon et al. | |
| 2008/0042486 A1 | 2/2008 | Katsuhito et al. | |
| 2008/0062148 A1 | 3/2008 | Hotelling et al. | |
| 2008/0100572 A1 | 5/2008 | Boillot | |
| 2008/0174321 A1 | 7/2008 | Kang et al. | |
| 2008/0246496 A1 | 10/2008 | Hristov et al. | |
| 2008/0303770 A1 | 12/2008 | Oke et al. | |
| 2009/0009485 A1 | 1/2009 | Bytheway | |
| 2009/0091546 A1 | 4/2009 | Joo et al. | |
| 2009/0141046 A1 | 6/2009 | Rathnam et al. | |
| 2009/0174686 A1 | 7/2009 | Jeon et al. | |
| 2009/0179868 A1 | 7/2009 | Ayres et al. | |
| 2009/0212642 A1 | 8/2009 | Krah | |
| 2009/0238012 A1 | 9/2009 | Tatapudi et al. | |
| 2009/0309851 A1 | 12/2009 | Bernstein | |
| 2010/0004029 A1 | 1/2010 | Kim | |
| 2010/0019779 A1 | 1/2010 | Kato et al. | |
| 2010/0031174 A1 | 2/2010 | Kim | |
| 2010/0090964 A1 | 4/2010 | Soo et al. | |
| 2010/0097346 A1 | 4/2010 | Sleeman | |
| 2010/0123667 A1 | 5/2010 | Kim et al. | |
| 2010/0139991 A1 | 6/2010 | Philipp et al. | |
| 2010/0149127 A1 | 6/2010 | Fisher et al. | |
| 2010/0182018 A1 | 7/2010 | Hazelden | |
| 2010/0201635 A1 | 8/2010 | Klinghult et al. | |
| 2010/0328262 A1 | 12/2010 | Huang et al. | |
| 2011/0001491 A1 | 1/2011 | Huang et al. | |
| 2011/0007021 A1 | 1/2011 | Bernstein et al. | |
| 2011/0007030 A1 | 1/2011 | Mo et al. | |
| 2011/0061949 A1 | 3/2011 | Krah et al. | |
| 2011/0080391 A1 | 4/2011 | Brown et al. | |
| 2011/0210941 A1 * | 9/2011 | Reynolds | G06F 3/0418 345/174 |
| 2012/0182251 A1 | 7/2012 | Krah | |
| 2012/0187965 A1 | 7/2012 | Roziere | |
| 2013/0106755 A1 | 5/2013 | Hotelling et al. | |
| 2013/0176276 A1 * | 7/2013 | Shepelev | G06F 3/044 345/174 |
| 2013/0194229 A1 * | 8/2013 | Sabo | G06F 3/044 345/174 |
| 2013/0194231 A1 | 8/2013 | Smith et al. | |
| 2013/0314393 A1 | 11/2013 | Min et al. | |
| 2013/0328795 A1 | 12/2013 | Yao et al. | |
| 2013/0335342 A1 * | 12/2013 | Kim | G06F 3/044 345/173 |
| 2013/0342431 A1 | 12/2013 | Saeedi et al. | |
| 2013/0342479 A1 | 12/2013 | Pyo et al. | |
| 2014/0028535 A1 | 1/2014 | Min et al. | |
| 2014/0049507 A1 * | 2/2014 | Shepelev | G06F 3/0412 345/174 |
| 2014/0070823 A1 | 3/2014 | Roziere | |
| 2014/0078097 A1 * | 3/2014 | Shepelev | G06F 3/044 345/174 |
| 2014/0111496 A1 | 4/2014 | Gomez et al. | |
| 2014/0132534 A1 | 5/2014 | Kim | |
| 2014/0267165 A1 | 9/2014 | Roziere | |
| 2014/0333582 A1 * | 11/2014 | Huo | G02F 1/13338 345/174 |
| 2014/0362029 A1 * | 12/2014 | Mo | G06F 3/044 345/174 |
| 2015/0002752 A1 * | 1/2015 | Shepelev | G06F 3/044 349/12 |
| 2015/0277648 A1 * | 10/2015 | Small | G06F 3/0416 345/174 |
| 2016/0034102 A1 | 2/2016 | Roziere et al. | |
| 2016/0170533 A1 | 6/2016 | Roziere | |
| 2016/0211808 A1 | 7/2016 | Lee et al. | |
| 2016/0246403 A1 * | 8/2016 | Zhao | G06F 3/041 |
| 2016/0320898 A1 | 11/2016 | Tang | |
| 2017/0108968 A1 | 4/2017 | Roziere | |
| 2017/0220156 A1 | 8/2017 | Blondin | |
| 2017/0315646 A1 | 11/2017 | Roziere | |

FOREIGN PATENT DOCUMENTS

| | | |
|---|---|---|
| DE | 11-2012 004912 T5 | 8/2014 |
| EP | 2 144 146 A | 1/2010 |
| EP | 2 148 264 A | 1/2010 |
| EP | 2 224 277 A | 9/2010 |
| FR | 2 756 048 A1 | 5/1998 |
| FR | 2 896 595 | 7/2007 |
| FR | 3 004 551 A1 | 10/2014 |
| JP | 2000-163031 A | 6/2000 |
| JP | 2002-342033 A | 11/2002 |
| JP | 2004-526265 A | 8/2004 |
| JP | 2006-251927 A | 9/2006 |
| JP | 2008-117371 A | 5/2008 |
| JP | 2009-086240 A | 4/2009 |
| JP | 2009-157373 A | 7/2009 |
| JP | 2013-109095 A | 6/2013 |
| KR | 10-2008-0041278 A | 5/2008 |
| KR | 10-2011-0044670 A | 4/2011 |
| WO | WO-2006/126703 A2 | 11/2006 |
| WO | WO-2007/146780 A2 | 12/2007 |
| WO | WO-2008/000964 A1 | 1/2008 |
| WO | WO-2008/030780 A1 | 3/2008 |
| WO | WO-2011/015795 | 2/2011 |
| WO | WO-2013/093327 | 6/2013 |
| WO | WO-2016/066282 | 5/2016 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

(56) References Cited

OTHER PUBLICATIONS

Notice of Allowance dated Jul. 30, 2018, for U.S. Appl. No. 15/089,432, filed Apr. 1, 2016, nine pages.
Non-Final Office Action dated Jan. 24, 2018, for U.S. Appl. No. 15/089,432, filed Apr. 1, 2016, 27 pages.

* cited by examiner

COMMON ELECTRODE DRIVING AND COMPENSATION FOR PIXELATED SELF-CAPACITANCE TOUCH SCREEN

CROSS-REFERENCES TO RELATED APPLICATIONS

This application is a continuation of U.S. patent application Ser. No. 15/524,611, filed May 4, 2017, which is a National Phase application under 35 U.S.C. § 371 of International Application No. PCT/US2014/064120, filed Nov. 5, 2014, the entire disclosures of which are incorporated herein by reference in their entireties for all purposes.

FIELD OF THE DISCLOSURE

This relates generally to touch screens, and more particularly to selectively driving common electrodes in an integrated touch screen.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and approaching objects may be detected near the surface without actually touching the surface.

Capacitive touch sensor panels can be formed by a matrix of substantially transparent conductive plates made of materials such as Indium Tin Oxide (ITO). It is due in part to their substantial transparency that capacitive touch sensor panels can be overlaid on a display to form a touch screen, as described above. Some touch screens can be formed by partially integrating touch sensing circuitry into a display pixel stackup (i.e., the stacked material layers forming the display pixels).

SUMMARY OF THE DISCLOSURE

Some capacitive touch sensor panels can be formed by a matrix of substantially transparent conductive plates made of materials such as Indium Tin Oxide (ITO), and some touch screens can be formed by partially integrating touch sensing circuitry into a display pixel stackup (i.e., the stacked material layers forming the display pixels). In some examples, common electrodes on the touch screen can serve as touch sensing circuitry during a touch sensing phase, and can serve as display circuitry during a display phase. During the display phase, the common electrodes may be driven to a reference voltage while display pixels are updated or scanned. It can be beneficial to drive only a portion of the common electrodes at a given time to reduce the load presented by the common electrodes to the driving circuitry. In some examples, only the common electrodes associated with the display pixels being updated are driven to the reference voltage, while the remaining common electrodes are left floating or are weakly driven. In some examples, the driving circuitry driving the common electrodes utilizes feedback from neighboring common electrodes to increase the accuracy of the voltage on the common electrodes being driven. In some examples, the driving circuitry is separate from the touch sensing circuitry of the touch screen, and in some examples, the driving circuitry is integrated with the touch sensing circuitry of the touch screen.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent conductive plates made of materials such as Indium Tin Oxide (ITO), and some touch screens can be formed by partially integrating touch sensing circuitry into a display pixel stackup (i.e., the stacked material layers forming the display pixels). In some examples, common electrodes on the touch screen can serve as touch sensing circuitry during a touch sensing phase, and can serve as display circuitry during a display phase. During the display phase, the common electrodes may be driven to a reference voltage while display pixels are updated or scanned. It can be beneficial to drive only a portion of the common electrodes at a given time to reduce the load presented by the common electrodes to the driving circuitry. In some examples, only the common electrodes associated with the display pixels being updated are driven to the reference voltage, while the remaining common electrodes are left floating or are weakly driven. In some examples, the driving circuitry driving the common electrodes utilizes feedback from neighboring common electrodes to increase the accuracy of the voltage on the common electrodes being driven. In some examples, the driving circuitry is separate from the touch sensing circuitry of the touch screen, and in some examples, the driving circuitry is integrated with the touch sensing circuitry of the touch screen.

Figure 1C:
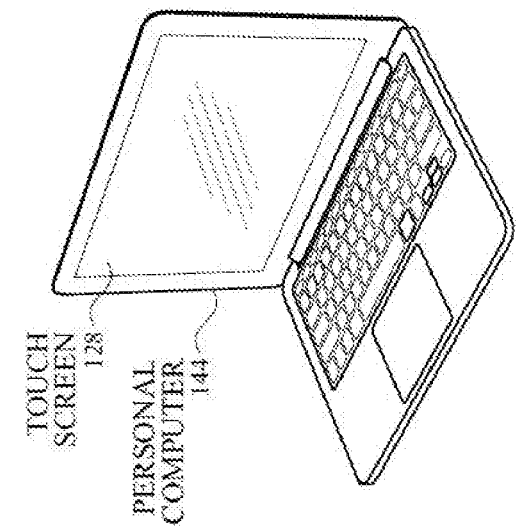
FIGS. 1A-1C illustrate an example mobile telephone, an example media player, and an example portable computing device that can each include an exemplary touch screen according to examples of the disclosure.
Figure 1B:
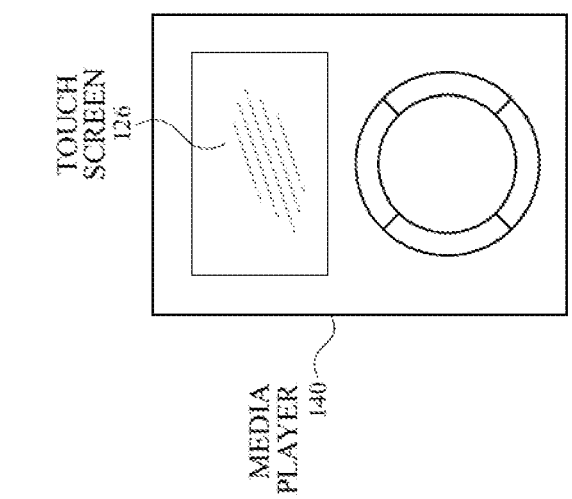
Figure 1A:
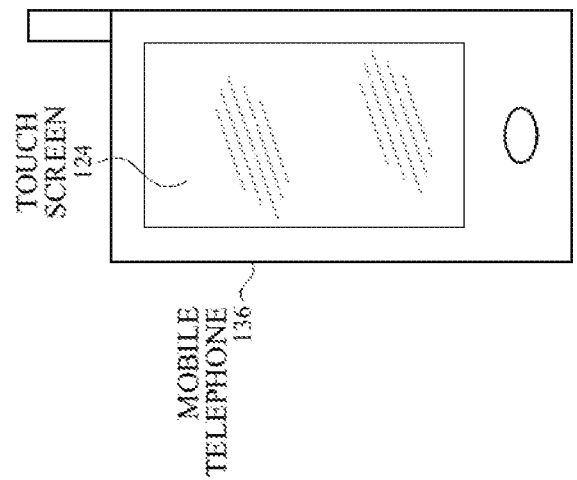

FIGS. 1A-1C show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example portable computing device 144 that includes a touch screen 128. It is understood that the above touch screens can be implemented in other devices as well, including in wearable devices.

In some examples, touch screens 124, 126 and 128 can be based on self-capacitance. A self-capacitance based touch system can include a matrix of individual plates of conductive material that can be referred to as touch pixel electrodes (as described below with reference to touch screen 220 in FIG. 2). For example, a touch screen can include a plurality of individual touch pixel electrodes, each touch pixel electrode identifying or representing a unique location on the touch screen at which touch or proximity (hovering) (i.e., a touch or proximity event) is to be sensed, and each touch pixel electrode being electrically isolated from the other touch pixel electrodes in the touch panel/screen. Such a touch screen can be referred to as a pixelated self-capacitance touch screen. During operation, a touch pixel electrode can be stimulated with an AC waveform, and the self-capacitance to ground of the touch pixel electrode can be measured. As an object approaches the touch pixel electrode, the self-capacitance to ground of the touch pixel electrode can change. This change in the self-capacitance of the touch pixel electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above.

Figure 2:
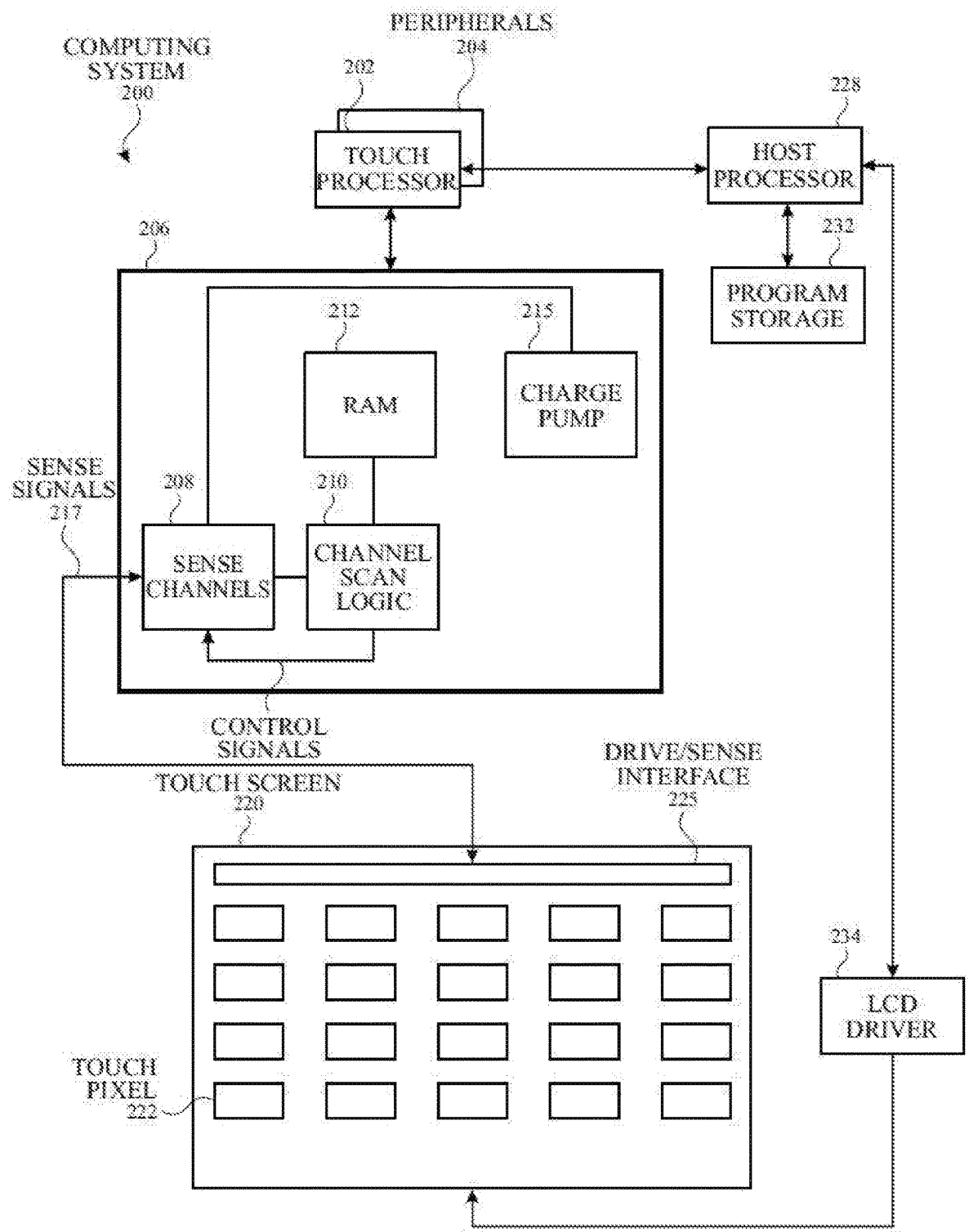
FIG. 2 is a block diagram of an example computing system that illustrates one implementation of an example touch screen according to examples of the disclosure.

FIG. 2 is a block diagram of an example computing system 200 that illustrates one implementation of an example touch screen 220 according to examples of the disclosure. Computing system 200 can be included in, for example, mobile telephone 136, digital media player 140, portable computing device 144, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch pixel electrodes of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can be a self-capacitance touch screen, and can include touch sensing circuitry that can include a capacitive sensing medium having a plurality of electrically isolated touch pixel electrodes 222 (e.g., a pixelated self-capacitance touch screen). It is understood that while touch screen 220 is described here as including touch pixel electrodes 222, the touch screen can additionally or alternatively include rows and columns of conductive material; the operation of such a touch screen would be similar to that described here. Additionally, it is understood that in some examples, touch screen 220 can be a mutual capacitance touch screen, as described above, though the description that follows will assume that the touch screen is a self-capacitance touch screen having a plurality of touch pixel electrodes. Touch pixel electrodes 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch pixel electrodes 222) as "touch pixel" electrodes can be particularly useful when touch screen 220 is viewed as capturing an "image" of touch. In other words, after touch controller 206 has determined an amount of touch detected at each touch pixel electrode 222 in touch screen 220, the pattern of touch pixel electrodes in the touch screen at which a touch occurred can be thought of as an "image" of touch (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (gate) lines to each pixel transistor and can provide data signals along data lines to these same transistors to control the pixel display image as described in more detail below. Host processor 228 can use LCD driver 234 to generate an image on touch screen 220, such as an image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration and operation of electrodes and sense channels, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
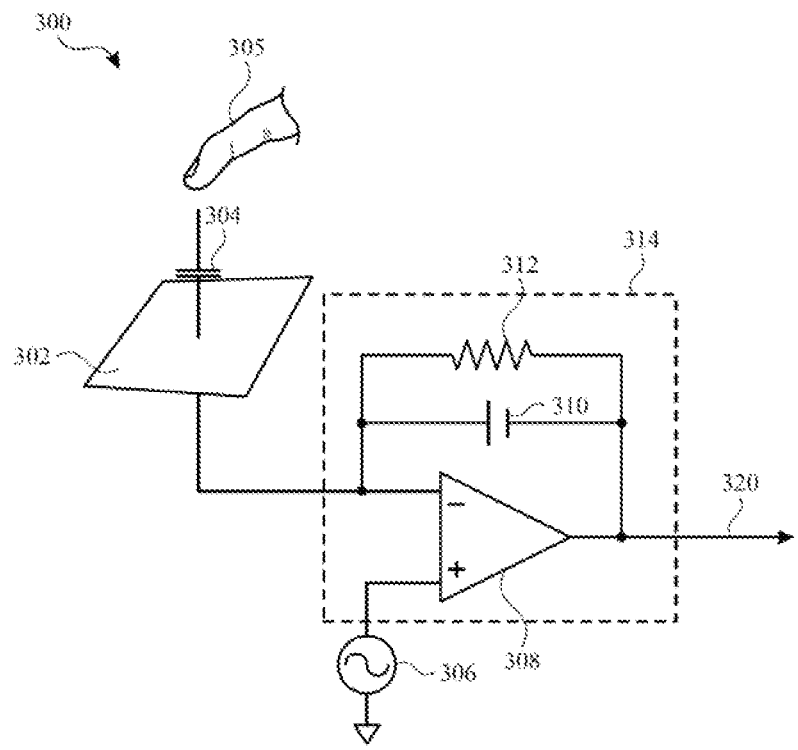
FIG. 3A illustrates an exemplary touch sensor circuit corresponding to a self-capacitance touch pixel electrode and sensing circuit according to examples of the disclosure.

FIG. 3A illustrates an exemplary touch sensor circuit 300 corresponding to a self-capacitance touch pixel electrode 302 and sensing circuit 314 according to examples of the disclosure. Touch pixel electrode 302 can correspond to touch pixel electrode 222. Touch pixel electrode 302 can have an inherent self-capacitance to ground associated with it, and also an additional self-capacitance to ground that is formed when an object, such as finger 305, is in proximity to or touching the electrode. The total self-capacitance to ground of touch pixel electrode 302 can be illustrated as capacitance 304. Touch pixel electrode 302 can be coupled to sensing circuit 314 (which can correspond to sense channels 208). Sensing circuit 314 can include an operational amplifier 308, feedback resistor 312, feedback capacitor 310 and an input voltage source 306, although other configurations can be employed. For example, feedback resistor 312 can be replaced by a switched capacitor resistor in order to minimize any parasitic capacitance effect caused by a variable feedback resistor. Touch pixel electrode 302 can be coupled to the inverting input of operational amplifier 308. An AC voltage source 306 (Vac) can be coupled to the non-inverting input of operational amplifier 308. Touch sensor circuit 300 can be configured to sense changes in the total self-capacitance 304 of the touch pixel electrode 302 induced by a finger or object either touching or in proximity to the touch sensor panel. Output 320 can be used by a processor (e.g., touch controller 206) to determine the presence of a touch event, or the output can be inputted into a discrete logic network to determine the presence of a touch or proximity event. It is understood that a "touch event," as used in this disclosure, encompasses a finger or object touching the touch sensor panel (i.e., being in physical contact with the touch sensor panel), as well as the finger or object being in proximity to, but not touching, the touch sensor panel (e.g., hovering over the touch sensor panel). Touch sensor circuit 300 can represent the structure and/or operation of touch pixel sensing of the examples of the disclosure.

Figure 3B:
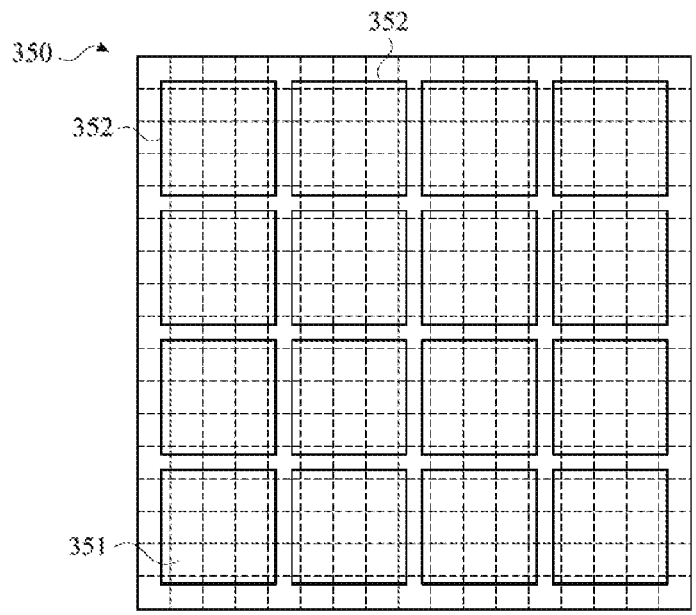
FIG. 3B illustrates an example configuration in which common electrodes can form portions of the touch sensing circuitry of a touch sensing system according to examples of the disclosure.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays (e.g., OLED displays), such as one or more pixel transistors (e.g., thin film transistors (TFTs)), gate lines, data lines, pixel electrodes and common electrodes. In any given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor. FIG. 3B illustrates an example configuration in which common electrodes 352 can form portions of the touch sensing circuitry of a touch sensing system—in some examples of this disclosure, the common electrodes can form touch pixel electrodes used to detect an image of touch on touch screen 350, as described above. Each common electrode 352 (i.e., touch pixel electrode) can include a plurality of display pixels 351, and each display pixel 351 can include a portion of a common electrode 352, which can be a circuit element of the display system circuitry in the display pixel stackup (i.e., the stacked material layers forming the display pixels) of the display pixels of some types of LCD or other displays that can operate as part of the display system to display an image.

In the example shown in FIG. 3B, each common electrode 352 can serve as a multi-function circuit element that can operate as display circuitry of the display system of touch screen 350 and can also operate as touch sensing circuitry of the touch sensing system. In this example, each common electrode 352 can operate as a common electrode of the display circuitry of the touch screen 350, as described above, and can also operate as touch sensing circuitry of the touch screen. For example, a common electrode 352 can operate as a capacitive part of a touch pixel electrode of the touch sensing circuitry during the touch sensing phase. Other circuit elements of touch screen 350 can form part of the touch sensing circuitry by, for example, switching electrical connections, etc. More specifically, in some examples, during the touch sensing phase, a gate line can be connected to a power supply, such as a charge pump, that can apply a voltage to maintain TFTs in display pixels included in a touch pixel electrode in an "off" state. Stimulation signals can be applied to common electrode 352. Changes in the total self-capacitance of common electrode 352 can be sensed through an operational amplifier, as previously discussed. The change in the total self-capacitance of common electrode 352 can depend on the proximity of a touch object, such as a finger, to the common electrode. In this way, the measured change in total self-capacitance of common electrode 352 can provide an indication of touch on or near the touch screen.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

The common electrodes 352 (i.e., touch pixel electrodes) and display pixels 351 of FIG. 3B are shown as rectangular or square regions on touch screen 350. However, it is understood that the common electrodes 352 and display pixels 351 are not limited to the shapes, orientations, and positions shown, but can include any suitable configurations according to examples of the disclosure.

As described above, the touch screen of the disclosure can include common electrodes that can operate as part of the display circuitry of the touch screen (e.g., operate as a common electrode during a display phase) and as part of the touch sensing circuitry of the touch screen (e.g., operate as a touch pixel electrode during a touch sensing phase). While operating as part of the display circuitry of the touch screen, the common electrodes can be driven to a specified display voltage so that the luminances of display pixels associated with the common electrodes can be set accurately. Because the common electrodes can be segmented, it may not be necessary for all of the common electrodes of the touch screen to be driven simultaneously during the display phase. Rather, only a portion of the common electrodes may be driven during the display phase, which can reduce the load seen by any driving circuitry that may be driving the common electrodes.

Figure 4A:
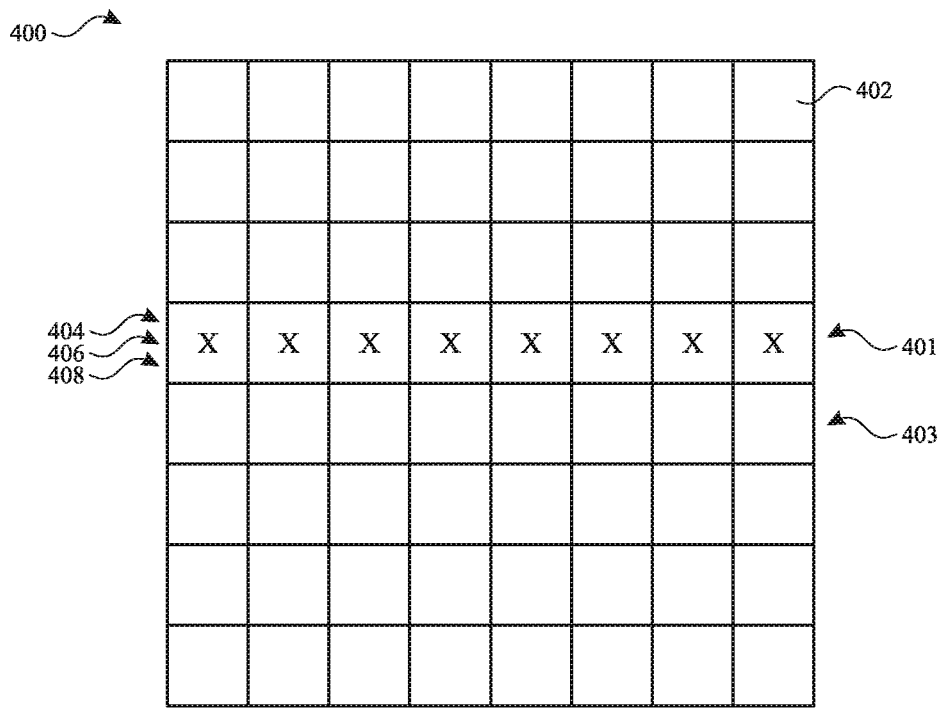
FIG. 4A illustrates an integrated touch screen in which only a first portion of its common electrodes can be actively driven at a given time, according to examples of the disclosure.

FIG. 4A illustrates an integrated touch screen 400 in which only a portion of its common electrodes can be actively driven at a given time, according to examples of the disclosure. Similar to as discussed above, touch screen 400 can include a plurality of common electrodes 402 that can operate as display circuitry (e.g., a portion of a capacitor formed by a pixel electrode and the common electrode) during a display phase, and can operate as touch sensing circuitry (e.g., a touch pixel electrode) during a touch sensing phase. Further, each common electrode 402 can include a plurality of display pixels whose luminances can be controlled by a voltage on the common electrode. When a luminance of a given display pixel is being updated during a display phase (i.e., when a display pixel is being "scanned"), it can be important for the voltage on the display pixel's common electrode 402 to be correct so that the display pixel's resulting luminance is correct. Thus, during the display phase, common electrode 402 can be driven to a specified display voltage (e.g., a reference AC and/or DC display voltage).

In some touch screens, the luminances of only a portion of the total number of display pixels in the touch screen may be being updated at any given time. For example, the display pixels in a touch screen may be updated (or "scanned") in a row-by-row fashion, from top to bottom, until all rows of display pixels have been updated (or "scanned"). As illustrated in FIG. 4A, a first row 404 of display pixels (the location of which is depicted in FIG. 4A, though the display pixels themselves are not) may be updated, followed by a second row 406 of display pixels, followed by a third row 408 of display pixels, and so on. Therefore, in some examples, only the common electrodes 402 corresponding to the display pixels being updated (e.g., rows 404, 406 and 408 of display pixels) may need to be driven to the specified display voltage, while the remaining common electrodes can be floating or weakly driven (e.g., a relatively small or weak voltage driver can apply a reference voltage to the common electrodes, such as a single operational amplifier in a unity gain configuration, for example). Even if floating, the voltages on these remaining common electrodes can remain substantially constant when not being driven, and thus the luminances of their respective display pixels can remain substantially constant, because the capacitances between the pixel electrodes of the display pixels and the common electrodes themselves can substantially maintain the voltages on the common electrodes—thus, visual artifacts can largely be avoided.

In the example illustrated in FIG. 4A, only row 401 of common electrode 402 can be driven to the specified display voltage (designated by "X" in the figures) while rows 404, 406 and 408 of display pixels are being updated. In this way, the load that common electrode drivers are required to drive can be reduced as compared with a common electrode driver that is required to drive all, or almost all, of the common electrodes at once—thus, the common electrode drivers can be made smaller in size than they might otherwise be, and can require less power than they might otherwise require. In some examples, each common electrode 402 can be driven by its own driver, which can substantially reduce the load presented by the common electrodes to each driver. In such cases, the drivers can be small and use relatively little power. In some examples, multiple common electrodes 402 can share a driver circuit. Many such configurations are contemplated.

Figure 4B:
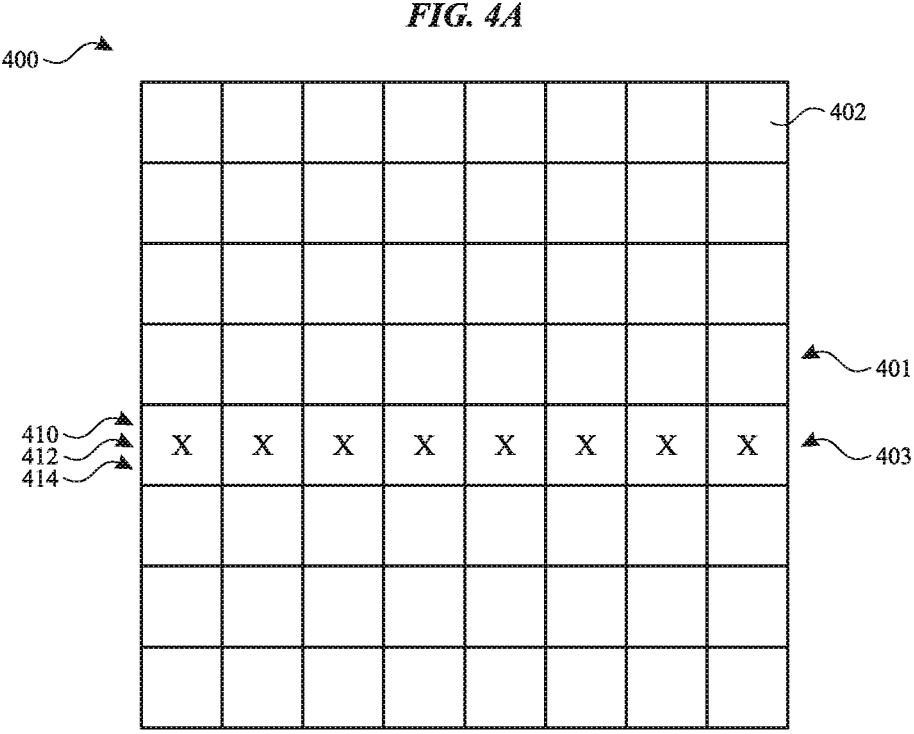
FIG. 4B illustrates an integrated touch screen in which only a second portion of its common electrodes can be actively driven at a given time, according to examples of the disclosure.

The rows of common electrodes 402 that are being driven at any given time can change depending on which rows of display pixels are being updated, such that the common electrodes that are being driven can correspond to the display pixels that are being updated. FIG. 4B illustrates a second row 403 of common electrodes 402 being driven to a specified display voltage in accordance with new display pixels that are being updated, according to examples of the disclosure. After rows 404, 406 and 408 of display pixels in row 401 of common electrodes 402 have been updated (as shown in FIG. 4A), row 410 of display pixels can be updated. Row 410 of display pixels can be included in row 403 of common electrodes 402. Therefore, after row 408 of display pixels has been updated, row 401 of common electrodes 402 can cease to be driven, and row 403 of common electrodes can start to be driven so that row 410 of display pixels can be updated. Subsequently, rows 412 and 414 of display pixels can be updated, similar to as discussed above. Such a common electrode and display pixel driving and updating scheme can be repeated across the entire touch screen 400 during a display phase until all of the display pixels in the touch screen have been updated.

The updating and driving of rows of display pixels and common electrodes is provided by way of example only. It is understood that the scope of the disclosure is not so limited, but rather extends to any scheme in which fewer than all display pixels in a touch screen are being updated at any given time, and a corresponding fewer than all common electrodes are being driven at that given time. For example, in some examples, display pixels may be updated in a column-by-column manner, and common electrodes can correspondingly be driven in a column-by-column manner In some examples, only the common electrode corresponding to a display pixel that is being updated can be driven. Other variations of the above are possible, and are within the scope of the disclosure.

In some examples, there can be a delay when switching from driving one row of common electrodes (e.g., row 401 of common electrodes 402) to driving another row of common electrodes (e.g., row 403 of common electrodes 402) due to various reasons, such as switching properties, resistances and/or capacitances that may exist in various components of the touch screen. In other words, a time period can exist during which the voltage on a row of common electrodes being driven can differ from a target voltage level, because the voltage may not have yet settled to the target level. If a display pixel associated with that row of common electrodes is being updated while the voltage on one or more of the common electrodes is incorrect, then the display pixel can be updated to have an incorrect luminance.

To avoid such a result, common electrodes can be "pre-driven" such that the voltages on them have settled to the correct value by the time their corresponding display pixels are to be updated. In some examples, this "pre-driving" can entail driving one or more common electrodes that are to be utilized after the presently-utilized common electrodes.

Figure 5A:
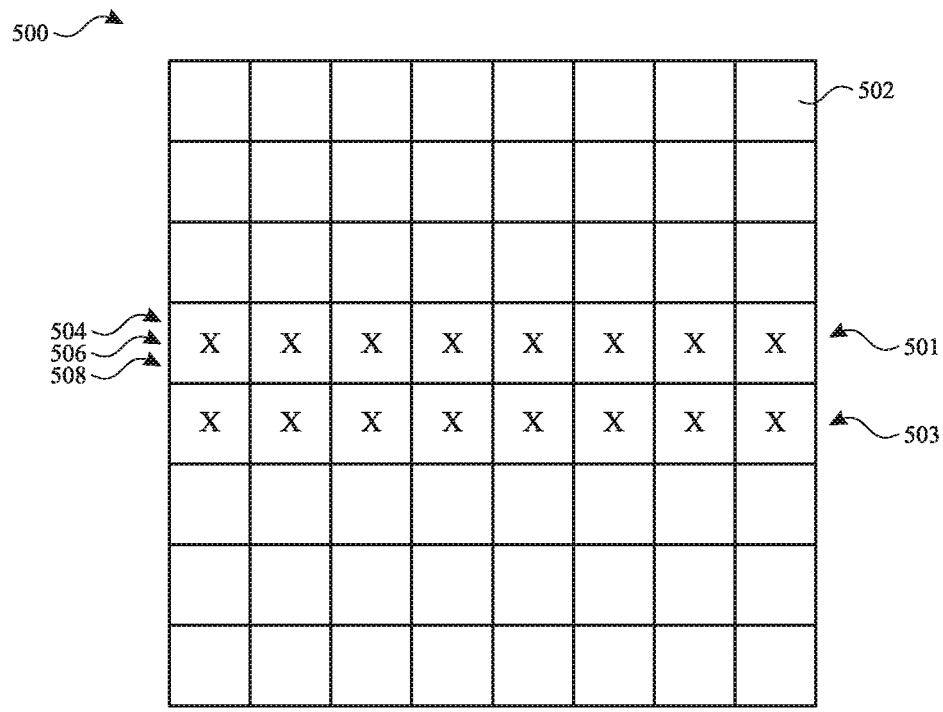
FIG. 5A illustrates an exemplary touch screen in which common electrodes can be driven before they are utilized ("pre-driven"), according to examples of the disclosure.

FIG. 5A illustrates an exemplary touch screen 500 in which common electrodes 502 can be driven before they are utilized, according to examples of the disclosure. Touch screen 500 can be substantially similar to touch screen 400 in FIG. 4A. However, in FIG. 5A, one or more common electrodes 502 can be driven before their corresponding display pixels are updated during a display phase. In this way, the voltage(s) on those common electrodes 502 can have settled to a target value by the time the display pixels associated with those common electrodes are updated. For example, as before, rows 504, 506 and 508 of display pixels can be updated during a display phase. While rows 504, 506 and 508 of display pixels are being updated, row 501 of common electrodes 502 can be driven to a specified display voltage so that the correct luminance values can be set for the display pixels in rows 504, 506 and 508. However, in contrast to FIG. 4A, row 503 of common electrodes 502 can also be driven to the specified display voltage while row 501 of the common electrodes is being driven so that the voltage at row 503 of the common electrodes can have settled to the correct value when display pixels associated with that row are to be updated.

Figure 5B:
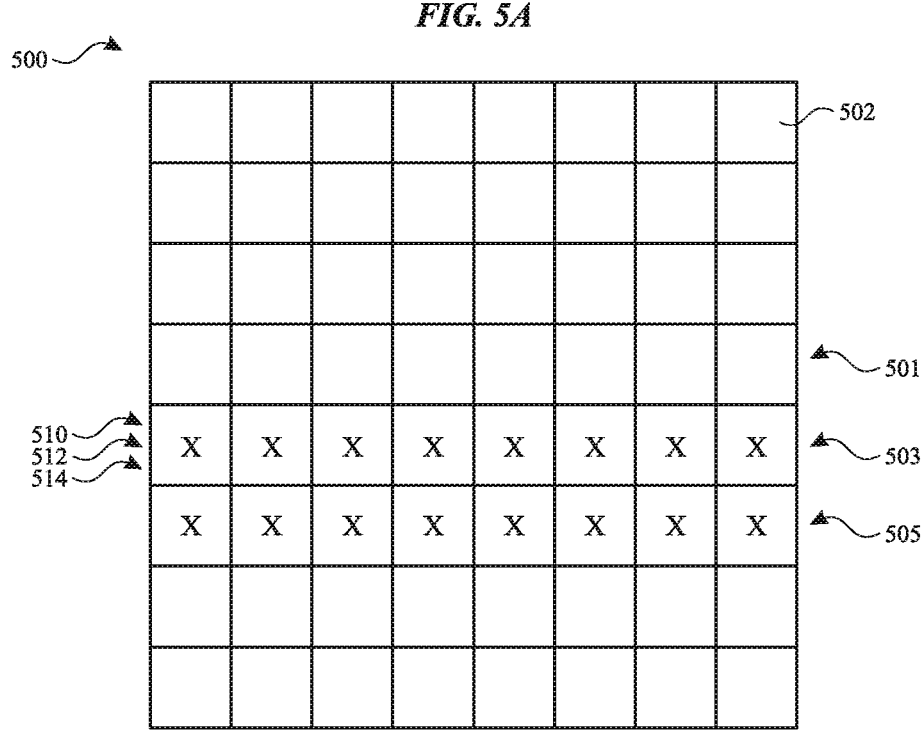
FIG. 5B illustrates an exemplary touch screen of the disclosure when "pre-driven" common electrodes are utilized, according to examples of the disclosure.

FIG. 5B illustrates an exemplary touch screen 500 of the disclosure when "pre-driven" common electrodes are utilized, according to examples of the disclosure. After rows 504, 506 and 508 of display pixels in row 501 of common electrodes 502 have been updated (as illustrated in FIG. 5A), rows 510, 512 and 514 of display pixels in row 503 of the common electrodes can be updated (as illustrated in FIG. 5B). Because row 503 of common electrodes 502 could have been driven to the specified display voltage before row 510 of display pixels is updated, the voltage on row 503 of the common electrodes can have settled to the specified display voltage in advance of row 510 of display pixels being updated. In this way, row 510 of display pixels can be updated without added delay resulting from first needing to drive row 503 of common electrodes 502 to the specified display voltage, and without concerns over one or more of the display pixels in row 510 of display pixels being updated with an incorrect luminance.

Additionally, after rows 504, 506 and 508 of display pixels in row 501 of common electrodes 502 have been updated (as illustrated in FIG. 5A), row 501 of the common electrodes can cease to be driven, because the display pixels in row 501 of the common electrodes can have already been updated. Instead, row 505 of common electrodes 502 can begin to be driven so that the voltage on row 505 of the common electrodes can be ready when the display pixels in that row are to be updated. Common electrodes 502 that are not being driven or "pre-driven" can be floating or weakly driven, as discussed previously. The driving and updating scheme of FIGS. 5A and 5B can be repeated across touch screen 500 until all of the display pixels in the touch screen have been updated. In some examples, more than two rows of common electrodes 502 can be driven at a given time. It is understood that the common electrodes that are "pre-driven" do not need to be adjacent to the common electrodes that are currently being driven. Rather, the "pre-driven" one or more common electrodes can be any common electrodes for which the corresponding display pixels will be updated after the currently-updated display pixel is updated. For example, if a display pixel in an upper-left corner of the touch screen is currently being updating, and its corresponding common electrode is being driven, and the next display pixel to be updated is in the lower-right corner of the touch screen, a common electrode in the lower-right corner of the touch screen, which corresponds to the display pixel in the lower-right corner of the touch screen, can be "pre-driven." Many other such variations are contemplated.

Figure 6A:
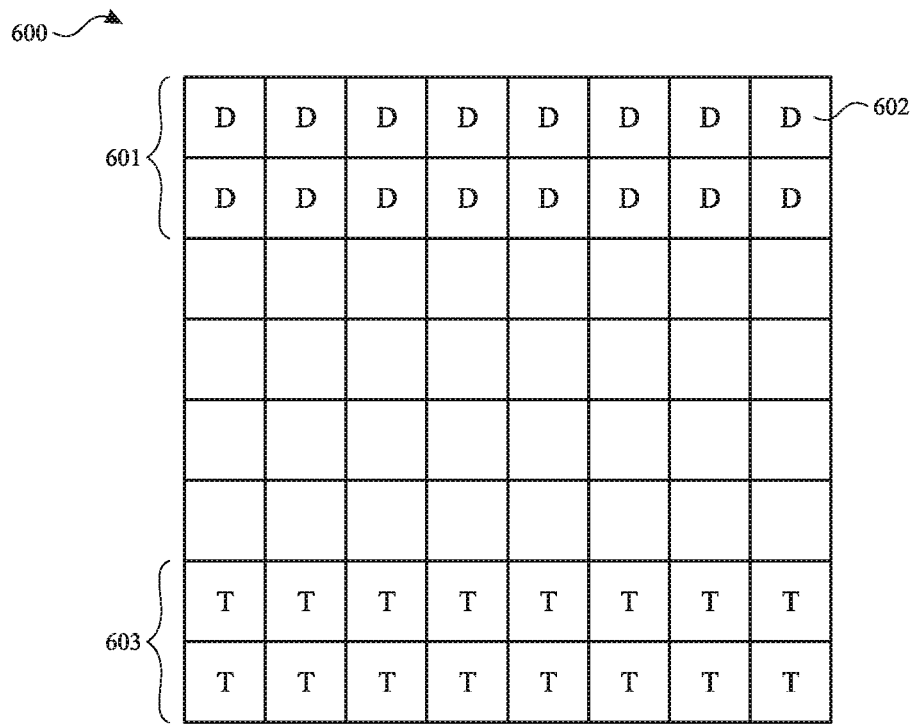
FIG. 6A illustrates an exemplary touch screen in which a first region of common electrodes performs a display functionality while a second region of the common electrodes performs a touch functionality, according to examples of the disclosure.

Because the common electrodes of the touch screen of the disclosure can be segmented, as described above, it can be possible for one or more regions of common electrodes to perform display functionality while one or more other regions of common electrodes perform touch functionality. FIG. 6A illustrates an exemplary touch screen 600 in which a first region 601 of common electrodes 602 performs a display functionality (designated with a "D" in the figures) while a second region 603 of the common electrodes performs a touch functionality (designated with a "T" in the figures), according to examples of the disclosure. Touch screen 600 can include common electrodes 602, similar to as described above with reference to FIGS. 4A-4B and 5A-5B. Region 601 of common electrodes 602 can be driven to a specified display voltage while display pixels in region 601 of the common electrodes are being updated. Display pixels in region 601 of common electrodes 602 can be updated as described above with reference to FIGS. 4A-4B and/or 5A-5B (e.g., in a row-by-row manner).

In some examples, while region 601 of common electrodes 602 is being driven to a specified display voltage for display operation, region 603 of the common electrodes can be driven to a specified touch voltage (e.g., an AC or DC voltage) for touch operation. For example, region 603 of common electrodes 602 can be driven to a specified touch voltage, independent of the specified display voltage, at which the common electrodes can sense touch activity at or near region 603 of the common electrodes. Touch can be sensed at common electrodes 602 in region 603 as described above with reference to FIG. 3A. In this way, a portion of touch screen 600 can operate in a display phase while another portion of the touch screen can operate in a touch sensing phase.

In some examples, instead of actually sensing touch in region 603 while region 601 of common electrodes 602 is driven to the specified display voltage for display operation, region 603 of the common electrodes can be "pre-driven" to the specified touch voltage to prepare for touch sensing after the display pixels in region 601 of the common electrodes have been updated. Region 603 of common electrodes 602 can be "pre-driven" to the specified touch voltage using any suitable circuitry, such as sensing circuit 314 in FIG. 3A, for example.

Figure 6B:
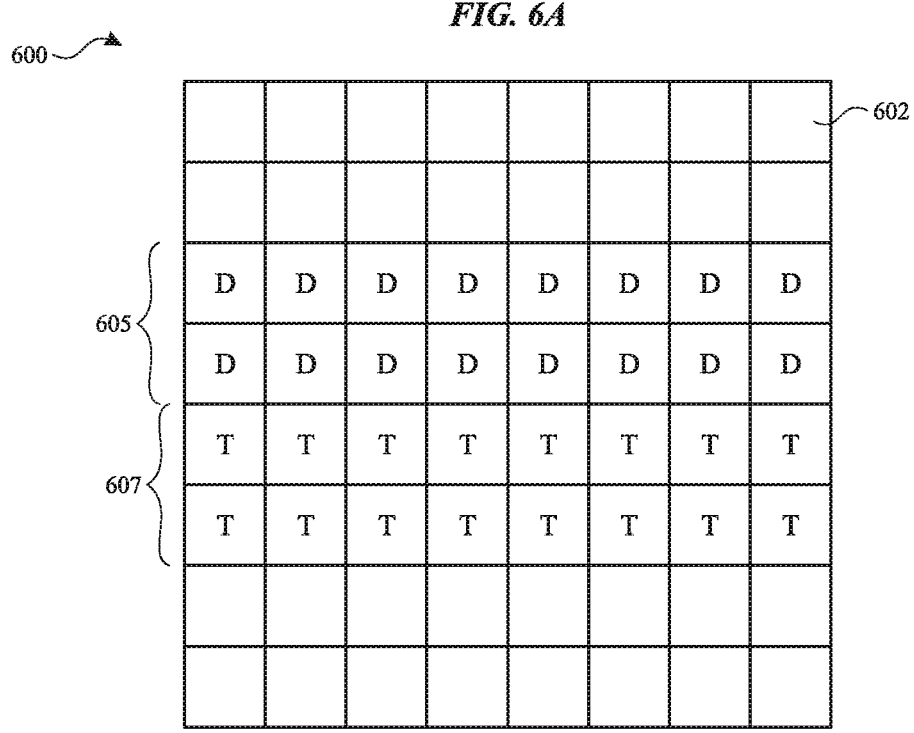
FIG. 6B illustrates an exemplary touch screen in which a region of common electrodes can perform a display functionality while another region of the common electrodes can perform a touch functionality, according to examples of the disclosure.

The above display and touch driving and updating scheme can be repeated across touch screen 600 until all of common electrodes 602 have been driven to a specified display voltage and driven to a specified touch voltage. For example, FIG. 6B illustrates exemplary touch screen 600 in which region 605 of common electrodes 602 can perform a display functionality while region 607 of the common electrodes can perform a touch functionality, according to examples of the disclosure. As stated above, this driving scheme can be repeated across touch screen 600. For example, in a next time period, region 607 of common electrodes 602 can perform a display functionality while region 605 of the common electrodes can perform a touch functionality.

Because the luminances of display pixels can be based on the voltages on the common electrodes of the touch screen, it can be important that the common electrodes be driven to the correct voltage. For example, if neighboring common electrodes are driven to slightly different voltages, the display pixels associated with each common electrode can have slightly different luminances, which can result in visual artifacts on the touch screen. Common electrodes may have slightly different voltages due to capacitances that may exist between the common electrodes and other components of the touch screen; for example, between the common electrodes and data lines in the touch screen. In such circumstances, fluctuations in voltage on the data lines can capacitively couple to the common electrodes to cause corresponding fluctuations in voltage on the common electrodes. In some examples, the common electrodes can be driven to the specified voltages discussed above using an operational amplifier in a unity gain configuration, for example. However, in some examples, feedback can be utilized to try to maximize the accuracy of the voltage to which the common electrodes are being driven.

Figure 7A:
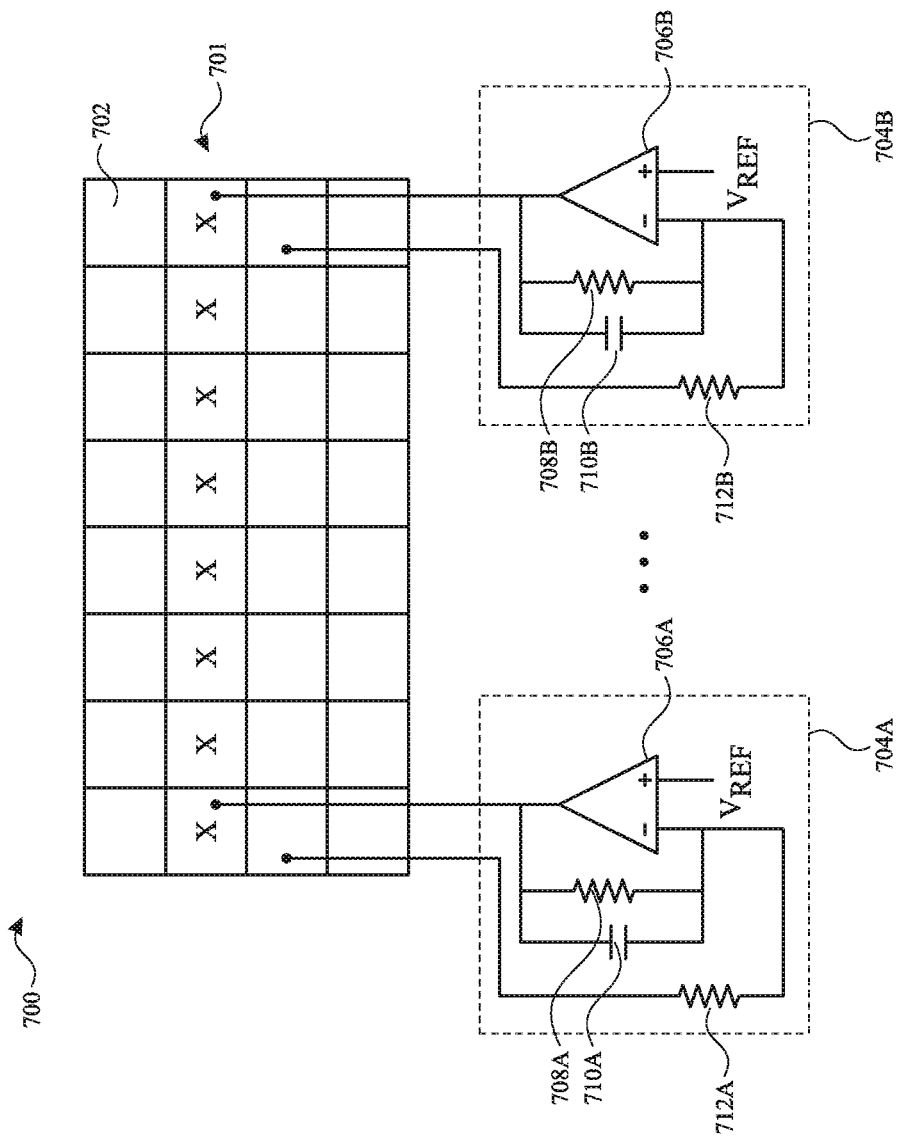
FIG. 7A illustrates exemplary driving circuits having feedback, according to examples of the disclosure.

FIG. 7A illustrates exemplary driving circuits 704 having feedback, according to examples of the disclosure. Touch screen 700 can include common electrodes 702, as described previously. Row 701 of common electrodes 702 can be driven to a specified display voltage, for example, as previously described. It is understood that while FIG. 7A illustrates a single row 701 of common electrodes 702 being driven, the examples of FIG. 7A can be extended to the driving of more or less common electrodes than those illustrated (e.g., driving multiple rows, driving individual common electrodes, driving groups of common electrodes, etc.).

Common electrodes 702 in row 701 can be driven by driving circuits 704. In some examples, each common electrode 702 can be driven by its own driving circuit 704 (e.g., 704A, 704B, etc.); however, it is understood that this need not be the case, as driving circuits 704 can similarly drive more than one common electrode. Only two driving circuits 704A and 704B are illustrated in FIG. 7A, but it is understood that additional driving circuits can be utilized in a manner similar to what will be described here.

Driving circuit 704A will now be described, and the description of driving circuit 704A can apply equally to driving circuit 704B and any additional driving circuits that may be driving common electrodes 702. Driving circuit 704A can include operational amplifier 706A. A reference voltage (Vref) can be coupled to the non-inverting input of operational amplifier 706A. Vref can be the voltage to which the common electrode 702 of interest is to be driven (e.g., the common electrode to which driving circuit 704A is coupled). Resistor 708A and capacitor 710A can be coupled between the output of operational amplifier 706A and the inverting input of the operational amplifier. Resistor 708A and capacitor 710A can control the gain of operational amplifier 706A. The output of operational amplifier 706A can be coupled to the common electrode 702 that the operational amplifier is driving.

Feedback can be provided to operational amplifier 706A by coupling, via resistor 712A, the inverting input of the operational amplifier to a common electrode that neighbors or is otherwise near the common electrode being driven by the operational amplifier. In some examples, the inverting input of operational amplifier 706A can be coupled to the common electrode 702 that the operational amplifier is driving; however, in some examples, only a single trace may be coupled to each common electrode 702 on touch screen 700. Therefore, it may not be possible to couple the common electrode 702 being driven to both the output of operational amplifier 706A and the inverting input of the operational amplifier. Thus, a neighboring or proximate common electrode 702 can be coupled to the inverting input of operational amplifier 706A instead.

In the example illustrated in FIG. 7A, a neighboring common electrode 702 directly below the common electrode being driven can provide the feedback to operational amplifier 706A, though it is understood that other configurations are possible (e.g., feedback being provided from a common electrode directly above the common electrode being driven, or otherwise proximate to the common electrode being driven). Because of its proximity to the driven common electrode, the feedback common electrode 702 can reflect deviations from the target voltage that might exist on the driven common electrode. Such deviations can be fed-back to operational amplifier 706 so that the operational amplifier can correct for those deviations, ensuring that the voltage on the common electrode being driven can be accurate.

It is understood that the provided configuration of driving circuits 704 is exemplary only, and that other circuit configurations may be employed. For example, resistor 712A may be removed from driving circuit 704A while still maintaining substantially similar operation.

Figure 7B:
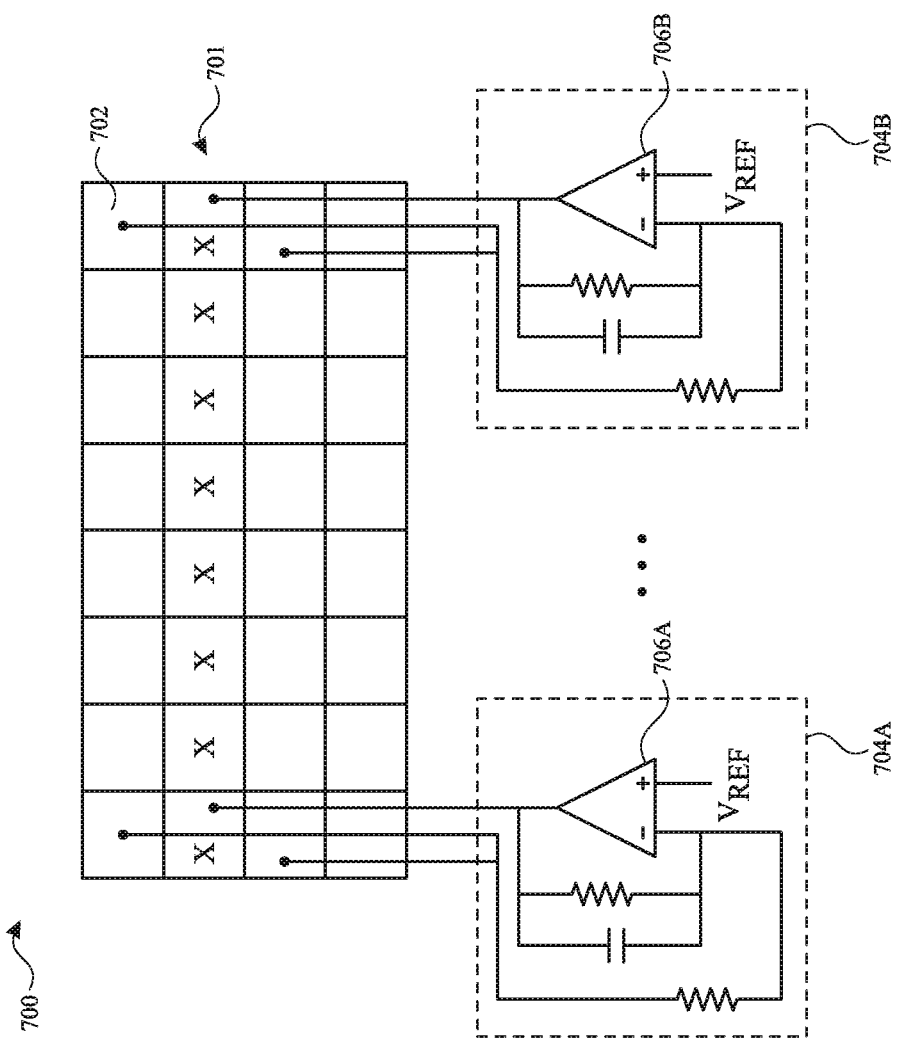
FIG. 7B illustrates exemplary driving circuits having a dual feedback configuration, according to examples of the disclosure.

In some examples, feedback may be provided to the driving circuits by more than one common electrode. FIG. 7B illustrates exemplary driving circuits 704 having a dual feedback configuration, according to examples of the disclosure. Driving circuits 704A and 704B can be substantially the same as those in FIG. 7A. One difference can be that the operational amplifiers 706A and 706B can receive feedback from two common electrodes 702 that are near the common electrodes that are being driven. In the example illustrated, the operational amplifiers 706A and 706B can receive feedback from the common electrodes directly above and directly below the common electrodes that are being driven by the operational amplifiers, for example. Other dual feedback configurations are contemplated, and are within the scope of the disclosure. For example, operational amplifiers 704A and 704B may receive feedback from more than two common electrodes 702 and/or receive feedback from common electrodes other than those directly above and below the common electrodes being driven.

Figure 8A:
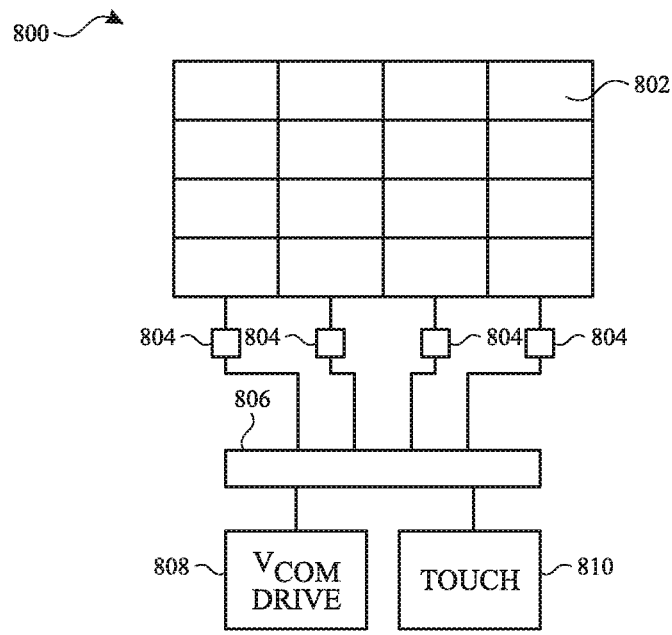
FIG. 8A illustrates an exemplary touch screen configuration in which the common electrode driving circuits are separate from the touch sensing circuitry of the touch screen, according to examples of the disclosure.

In some examples, the driving circuits discussed above with reference to FIGS. 7A and 7B can be separate from the touch sensing circuitry (e.g., one or more parts of touch controller 206, touch sensor circuit 300, etc.) of the touch screen of the disclosure. In some examples, the driving circuits can be integrated with the touch sensing circuitry of the touch screen of the disclosure. FIG. 8A illustrates an exemplary touch screen 800 configuration in which the common electrode driving circuits 808 are separate from the touch sensing circuitry 810 of the touch screen, according to examples of the disclosure. Driving circuits 808 can include circuits such as driving circuits 704A and 704B in FIGS. 7A-7B. Touch sensing circuitry 810 can include circuits such as touch sensor circuit 300 in FIG. 3A and/or one or more parts of touch controller 206 in FIG. 2. Driving circuits 808 and touch sensing circuitry 810 can be coupled to switching network 806. Switching network 806 can include one or more switches or circuits of any kind for selectively coupling common electrodes 802, via switching networks 804, to driving circuits 808 or touch sensing circuitry 810. Switching network 806 can be coupled to switching networks 804, which can be coupled to common electrodes 802. Each of switching networks 804 can be coupled to a plurality of common electrodes 802. For example, each of switching networks 804 can be coupled to the common electrodes 802 in a given column of common electrodes.

Through switching networks 804 and 806, common electrodes 802 can be coupled to driving circuits 808 or touch sensing circuitry 810, as appropriate (e.g., coupled to driving circuits to be driven during a display phase, and coupled to touch sensing circuitry to be sensed during a touch sensing phase). In some examples, a portion of common electrodes 802 can be coupled to driving circuits 808, while another portion of the common electrodes can be coupled to touch sensing circuitry 810, as appropriate and as discussed previously. Though not illustrated, in some examples, driving circuits 808 may be distributed and incorporated directly into switching networks 804, thus potentially eliminating the need for switching network 806.

Figure 8B:
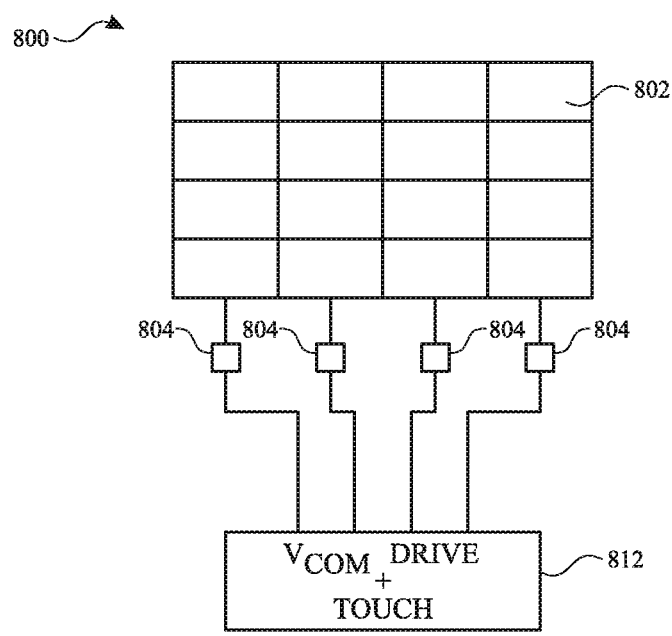
FIG. 8B illustrates an exemplary touch screen configuration in which the common electrode driving circuits are integrated with the touch sensing circuitry of the touch screen, according to examples of the disclosure.

FIG. 8B illustrates an exemplary touch screen 800 configuration in which the common electrode driving circuits are integrated with the touch sensing circuitry of the touch screen, according to examples of the disclosure. In some examples, the common electrode driving circuits and touch sensing circuitry can be integrated into a single component or chip 812. In some examples, this integration can simply entail including both the components of the driving circuits and the components of the touch sensing circuitry on the same chip. In some examples, this integration can entail sharing components between the driving circuitry and the touch sensing circuitry. For example, operational amplifiers may be shared (e.g., time-multiplexed) between driving circuitry (to drive common electrodes 802 during a display phase) and touch sensing circuitry (to sense the common electrodes during a touch sensing phase). In either circumstance, integrated driving and touch sensing circuit 812 can be coupled to common electrodes 802 via switching networks 804, similar to before.

Thus, the examples of the disclosure provide one or more configurations for driving a portion of the common electrodes in a touch screen, thus reducing the load-bearing requirements for the circuits that drive the common electrodes. Further, a pixelated self-capacitance touch screen as described in this disclosure provides a number of benefits compared to other touch screen types, such as water rejection, power savings, and better touch position accuracy.

Therefore, according to the above, some examples of the disclosure are directed to a touch screen comprising: a plurality of common electrodes configured to operate as display circuitry during a display phase, and to operate as touch sensing circuitry during a touch sensing phase, wherein the plurality of common electrodes includes: a first common electrode associated with a first display pixel; and a second common electrode associated with a second display pixel; and circuitry configured to: update the first display pixel at a first time while driving the first common electrode but not the second common electrode; and update the second display pixel at a second time, after the first time, while driving the second common electrode but not the first common electrode. Additionally or alternatively to one or more of the examples disclosed above, in some examples, the common electrodes are configured to operate as self-capacitance touch pixel electrodes during the touch sensing phase. Additionally or alternatively to one or more of the examples disclosed above, in some examples, driving the first common electrode comprises driving the first common electrode to a first reference voltage, and driving the second common electrode comprises driving the second common electrode to the first reference voltage. Additionally or alternatively to one or more of the examples disclosed above, in some examples, the first common electrode is part of a first set of common electrodes, the second common electrode is part of a second set of common electrodes, and the circuitry is further configured to: update the first display pixel while driving the first set of common electrodes but not the second set of common electrodes, and update the second display pixel while driving the second set of common electrodes but not the first set of common electrodes. Additionally or alternatively to one or more of the examples disclosed above, in some examples, the circuitry is further configured to: update a first set of display pixels, including the first display pixel, associated with the first set of common electrodes while driving the first set of common electrodes but not the second set of common electrode, and update a second set of display pixels, including the second display pixel, associated with the second set of common electrodes while driving the second set of common electrodes but not the first set of common electrodes. Additionally or alternatively to one or more of the examples disclosed above, in some examples, the first set of common electrodes comprises a first row of common electrodes, and the second set of common electrodes comprises a second row of common electrodes. Additionally or alternatively to one or more of the examples disclosed above, in some examples, the plurality of common electrodes further includes a third common electrode associated with a third display pixel, and the circuitry is further configured to: while updating the first display pixel and driving the first common electrode at the first time, drive the third common electrode until the third display pixel is updated, and after the first display pixel is updated, update the third display pixel while still driving the third common electrode, and cease driving the first common electrode. Additionally or alternatively to one or more of the examples disclosed above, in some examples, the first common electrode is part of a first set of common electrodes, the second common electrode is part of a second set of common electrodes, the third common electrode is part of a third set of common electrodes, and the circuitry is further configured to: update the first display pixel while driving the first set of common electrodes and the third set of common electrodes, but not the second set of common electrodes, update the third display pixel while driving the third set of common electrodes and the second set of common electrodes, but not the first set of common electrodes, and update the second display pixel while driving the second set of common electrodes but not the first set of common electrodes or the third set of common electrodes. Additionally or alternatively to one or more of the examples disclosed above, in some examples, the first set of common electrodes comprises a first row of common electrodes, the second set of common electrodes comprises a second row of common electrodes, and the third set of common electrodes comprises a third row of common electrodes. Additionally or alternatively to one or more of the examples disclosed above, in some examples, the circuitry comprises driving circuitry configurably coupled to the first common electrode and the second common electrode at the first time, and the driving circuitry is configured to drive the first common electrode and receive feedback from the second common electrode. Additionally or alternatively to one or more of the examples disclosed above, in some examples, the circuitry further comprises touch sensing circuitry, the touch sensing circuitry configured to sense touch on one or more of the plurality of common electrodes during the touch sensing phase. Additionally or alternatively to one or more of the examples disclosed above, in some examples, driving circuitry and the touch sensing circuitry are integrated into a single chip. Additionally or alternatively to one or more of the examples disclosed above, in some examples, the driving circuitry and the touch sensing circuitry share one or more circuit components. Additionally or alternatively to one or more of the examples disclosed above, in some examples, the circuitry is configured to leave the second common electrode floating while driving the first common electrode, and leave the first common electrode floating while driving the second common electrode. Additionally or alternatively to one or more of the examples disclosed above, in some examples, the touch screen further comprises second circuitry configured to weakly drive the second common electrode while the circuitry drives the first common electrode, and weakly drive the first common electrode while the circuitry drives the second common electrode.

Some examples of the disclosure are directed to a touch screen comprising: a plurality of common electrodes, the plurality of common electrodes including a first set of common electrodes and a second set of common electrodes, the first set of common electrodes associated with a first set of display pixels, and the second set of common electrodes associated with a second set of display pixels; and circuitry configured to: drive the first set of common electrodes to a display voltage while updating the first set of display pixels based on the display voltage; and while driving the first set of common electrodes to the display voltage, drive the second set of common electrodes to a touch voltage. Additionally or alternatively to one or more of the examples disclosed above, in some examples, the common electrodes are configured to operate as display circuitry during a display phase, and to operate as touch sensing circuitry during a touch sensing phase. Additionally or alternatively to one or more of the examples disclosed above, in some examples, the circuitry is further configured to sense touch at the second set of common electrodes. Additionally or alternatively to one or more of the examples disclosed above, in some examples, the circuitry is further configured to sense touch at the second set of common electrodes while updating the first set of display pixels. Additionally or alternatively to one or more of the examples disclosed above, in some examples, the circuitry is further configured to sense touch at the second set of common electrodes after updating the first set of display pixels. Additionally or alternatively to one or more of the examples disclosed above, in some examples, the circuitry is further configured to: drive the first set of common electrodes to the touch voltage; and while driving the first set of common electrodes to the touch voltage, drive the second set of common electrodes to the display voltage while updating the second set of display pixels based on the display voltage. Additionally or alternatively to one or more of the examples disclosed above, in some examples, the circuitry is further configured to: drive the first set of common electrodes to the display voltage and the second set of common electrodes to the touch voltage during a first time period, and drive the first set of common electrodes to the touch voltage and the second set of common electrodes to the display voltage during a second time period, after the first time period.

Some examples of the disclosure are directed to a method of operating a touch screen, the touch screen comprising a plurality of common electrodes configured to operate as display circuitry during a display phase, and to operate as touch sensing circuitry during a touch sensing phase, the method comprising: updating a first display pixel at a first time while driving a first common electrode but not a second common electrode, the first common electrode associated with the first display pixel, and the second common electrode associated with a second display pixel; and updating the second display pixel at a second time, after the first time, while driving the second common electrode but not the first common electrode.

Some examples of the disclosure are directed to a method of operating a touch screen, the touch screen comprising a plurality of common electrodes, the method comprising: driving a first set of the plurality of common electrodes to a display voltage while updating a first set of display pixels based on the display voltage, the first set of display pixels associated with the first set of common electrodes; and while driving the first set of common electrodes to the display voltage, driving a second set of the plurality of common electrodes to a touch voltage, the second set of common electrodes associated with a second set of display pixels. Additionally or alternatively to one or more of the examples disclosed above, in some examples, the method further comprises sensing touch at the second set of common electrodes after updating the first set of display pixels.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch screen comprising:
a plurality of common electrodes configured to operate as display circuitry during a display phase, and to operate as touch sensing circuitry during a touch sensing phase, wherein the plurality of common electrodes includes:
  a first common electrode associated with a first display pixel; and
  a second common electrode associated with a second display pixel; and circuitry configured to:
  update the first display pixel at a first time while driving the first common electrode;
  while updating the first display pixel and driving the first common electrode, drive the second common electrode until the second display pixel is updated; and
  after updating the first display pixel, update the second display pixel at a second time, after the first time, while continuing to drive the second common electrode but not the first common electrode.

2. The touch screen of claim 1, wherein the common electrodes are configured to operate as self-capacitance touch pixel electrodes during the touch sensing phase.

3. The touch screen of claim 1, wherein:
driving the first common electrode comprises driving the first common electrode to a first reference voltage, and
driving the second common electrode comprises driving the second common electrode to the first reference voltage.

4. The touch screen of claim 1, wherein:
the first common electrode and the second common electrode are part of a first set of common electrodes, and
the circuitry is further configured to:
  update the first display pixel while driving the first set of common electrodes but not a second set of common electrodes, different than the first set of common electrodes.

5. The touch screen of claim 4, wherein the circuitry is further configured to:

update a first set of display pixels associated with the first set of common electrodes while driving the first set of common electrodes but not the second set of common electrodes, and
update a second set of display pixels, different than the first set of display pixels, associated with the second set of common electrodes while driving the second set of common electrodes but not the first set of common electrodes.

6. The touch screen of claim 4, wherein the first set of common electrodes comprises one or more rows of common electrodes, and the second set of common electrodes comprises one or more rows of common electrodes.

7. The touch screen of claim 1, wherein:
the first common electrode is part of a first set of common electrodes,
the second common electrode is part of a second set of common electrodes,
a third common electrode is part of a third set of common electrodes, and
the circuitry is further configured to:
  update the first display pixel while driving the first set of common electrodes and the second set of common electrodes, but not the third set of common electrodes,
  update the second display pixel while driving the third set of common electrodes and the second set of common electrodes, but not the first set of common electrodes, and
  update the third display pixel while driving the third set of common electrodes but not the first set of common electrodes or the second set of common electrodes.

8. The touch screen of claim 7, wherein the first set of common electrodes comprises a first row of common electrodes, the second set of common electrodes comprises a second row of common electrodes, and the third set of common electrodes comprises a third row of common electrodes.

9. The touch screen of claim 1, wherein:
the circuitry comprises driving circuitry configurably coupled to the first common electrode, the second common electrode and a third common electrode at the first time, and
the driving circuitry is configured to drive the first common electrode and the second common electrode, and receive feedback from the third common electrode.

10. The touch screen of claim 9, wherein the circuity further comprises touch sensing circuitry, the touch sensing circuitry configured to sense touch on one or more of the plurality of common electrodes during the touch sensing phase.

11. The touch screen of claim 10, wherein the driving circuitry and the touch sensing circuitry are integrated into a single chip.

12. The touch screen of claim 11, wherein the driving circuitry and the touch sensing circuitry share one or more circuit components.

13. The touch screen of claim 1, wherein the circuitry is configured to leave a third common electrode floating while driving the first common electrode and the second common electrode, and leave the first common electrode floating while driving the second common electrode and the third common electrode.

14. The touch screen of claim 1, wherein the touch screen further comprises second circuitry configured to weakly drive a third common electrode while the circuitry drives the first common electrode and the second common electrode, and weakly drive the first common electrode while the circuitry drives the second common electrode and the third common electrode.

15. A touch screen comprising:
a plurality of common electrodes, the plurality of common electrodes including a first set of common electrodes and a second set of common electrodes, the first set of common electrodes associated with a first set of display pixels, and the second set of common electrodes associated with a second set of display pixels; and
circuitry configured to:
drive the first set of common electrodes to a display voltage while updating the first set of display pixels based on the display voltage;
while updating the first set of display pixels and driving the first set of common electrodes, drive the second set of common electrodes to the display voltage until the second set of display pixels is updated;
after updating the first set of display pixels, update the second set of display pixels based on the display voltage while continuing to drive the second set of common electrodes to the display voltage but not the first set of common electrodes; and
while driving the first set of common electrodes and the second set of common electrodes to the display voltage, drive a third set of common electrodes to a touch voltage.

16. The touch screen of claim 15, wherein the common electrodes are configured to operate as display circuitry during a display phase, and to operate as touch sensing circuitry during a touch sensing phase.

17. The touch screen of claim 16, wherein the circuitry is further configured to sense touch at the third set of common electrodes.

18. The touch screen of claim 17, wherein the circuitry is further configured to sense touch at the third set of common electrodes while updating the first set of display pixels.

19. The touch screen of claim 17, wherein the circuitry is further configured to sense touch at the third set of common electrodes after updating the first set of display pixels.

20. The touch screen of claim 15, wherein the circuitry is further configured to:
drive the first set of common electrodes to the touch voltage; and
while driving the first set of common electrodes to the touch voltage, drive the third set of common electrodes to the display voltage while updating a third set of display pixels associated with the third set of common electrodes based on the display voltage.

21. The touch screen of claim 20, wherein the circuitry is further configured to:

drive the first set of common electrodes to the display voltage and the third set of common electrodes to the touch voltage during a first time period, and
drive the first set of common electrodes to the touch voltage and the third set of common electrodes to the display voltage during a second time period, after the first time period.

22. A method of operating a touch screen, the touch screen comprising a plurality of common electrodes configured to operate as display circuitry during a display phase, and to operate as touch sensing circuitry during a touch sensing phase, the method comprising:
updating a first display pixel at a first time while driving a first common electrode, the first common electrode associated with the first display pixel, and the second common electrode associated with a second display pixel;
while updating the first display pixel and driving the first common electrode, driving the second common electrode until the second display pixel is updated; and
after updating the first display pixel, updating the second display pixel at a second time, after the first time, while continuing to drive the second common electrode but not the first common electrode.

23. A method of operating a touch screen, the touch screen comprising a plurality of common electrodes, the method comprising:
driving a first set of the plurality of common electrodes to a display voltage while updating a first set of display pixels based on the display voltage, the first set of display pixels associated with the first set of common electrodes;
while updating the first set of display pixels and driving the first set of common electrodes, driving a second set of the plurality of common electrodes to the display voltage until a second set of display pixels, associated with the second set of common electrodes, is updated;
after updating the first set of display pixels, updating the second set of display pixels based on the display voltage while continuing to drive the second set of common electrodes to the display voltage but not the first set of common electrodes; and
while driving the first set of common electrodes and the second set of common electrodes to the display voltage, driving a third set of the plurality of common electrodes to a touch voltage, the third set of common electrodes associated with a third set of display pixels.

24. The method of claim 23, further comprising:
sensing touch at the third set of common electrodes after updating the first set of display pixels.

* * * * *